United States Patent [19]

Lin

[11] 3,910,873

[45] Oct. 7, 1975

[54] PRODUCTION OF WATER-SOLUBLE POLYCARBOXYLIC LIGNIN BY AN OXYGEN-ALKALI PROCESS

[75] Inventor: Stephen Y. Lin, Mount Pleasant, S.C.

[73] Assignee: Westvaco Corporation, New York, N.Y.

[22] Filed: May 30, 1974

[21] Appl. No.: 474,784

[52] U.S. Cl.................. 260/124 R; 252/311.5; 8/92
[51] Int. Cl.² ............................................. C07G 1/00
[58] Field of Search ......... 260/124 R, 124 A, 124 C

[56] References Cited
UNITED STATES PATENTS

| | | | |
|---|---|---|---|
| 2,673,148 | 3/1954 | Harris | 260/124 R |
| 2,680,113 | 6/1954 | Adler et al. | 260/124 R |
| 3,726,850 | 4/1973 | Detroit | 260/124 R |

FOREIGN PATENTS OR APPLICATIONS

| | | | |
|---|---|---|---|
| 563,747 | 10/1923 | France | 260/124 R |

OTHER PUBLICATIONS

Pearl et al., Advances In Chem., Vol. 59, 1966, pp. 145–156.

*Primary Examiner*—Lewis Gotts
*Assistant Examiner*—D. R. Phillips
*Attorney, Agent, or Firm*—Richard L. Schmalz; Ernest B. Lipscomb, III

[57] ABSTRACT

There is disclosed a process for the introduction of carboxylic groups into lignin while preserving the polymeric lignin structure during oxidation. Kraft or soda lignin is recovered from black liquor and reacted in the presence of 5 to 50 percent by weight of sodium hydroxide and oxygen at a temperature between 25°C. and 200°C. to produce a polycarboxylic lignin which is soluble at pH as low as 3.3 at yields of at least 80 percent.

9 Claims, 4 Drawing Figures

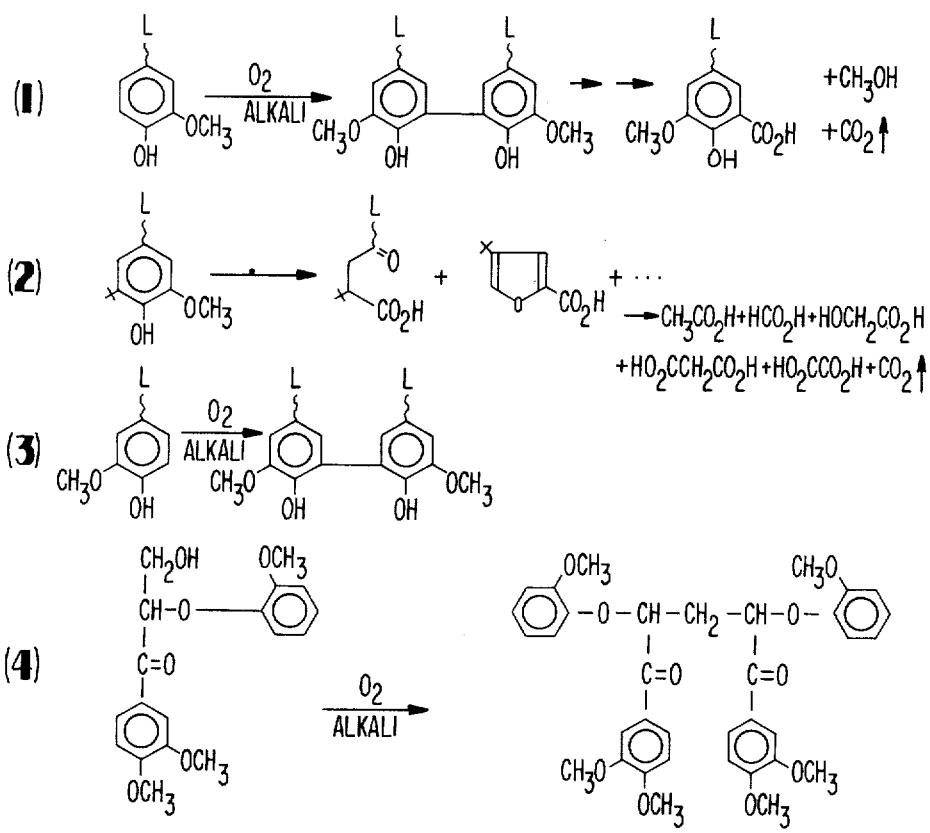
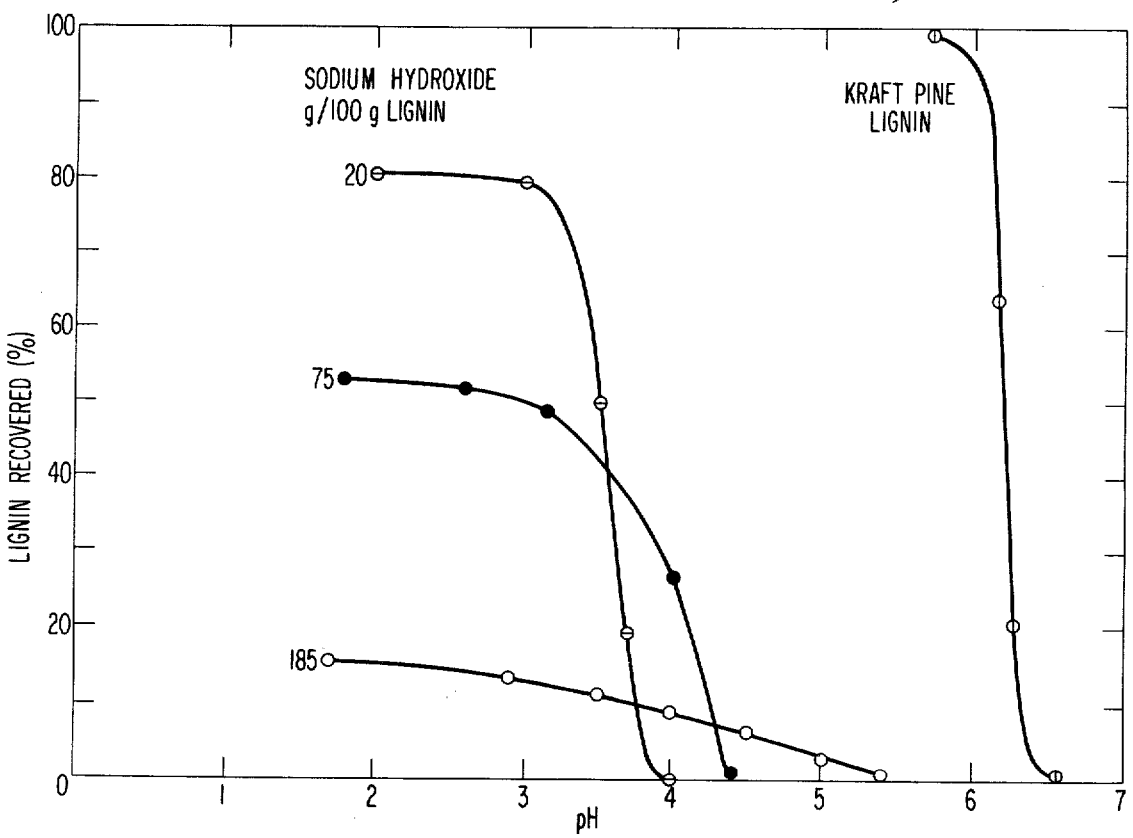
FIG. 2 PRECIPITATION CURVES OF CARBOXYLIC LIGNIN AND KRAFT PINE LIGNIN (2% SOLUTION) VS. CARBOXYLATED LIGNIN SAMPLES: REACTION TEMPERATURE, 170°C; REACTION TIME, 2 HOURS; LIGNIN-OXYGEN RATIO (BY WEIGHT) = 100:150

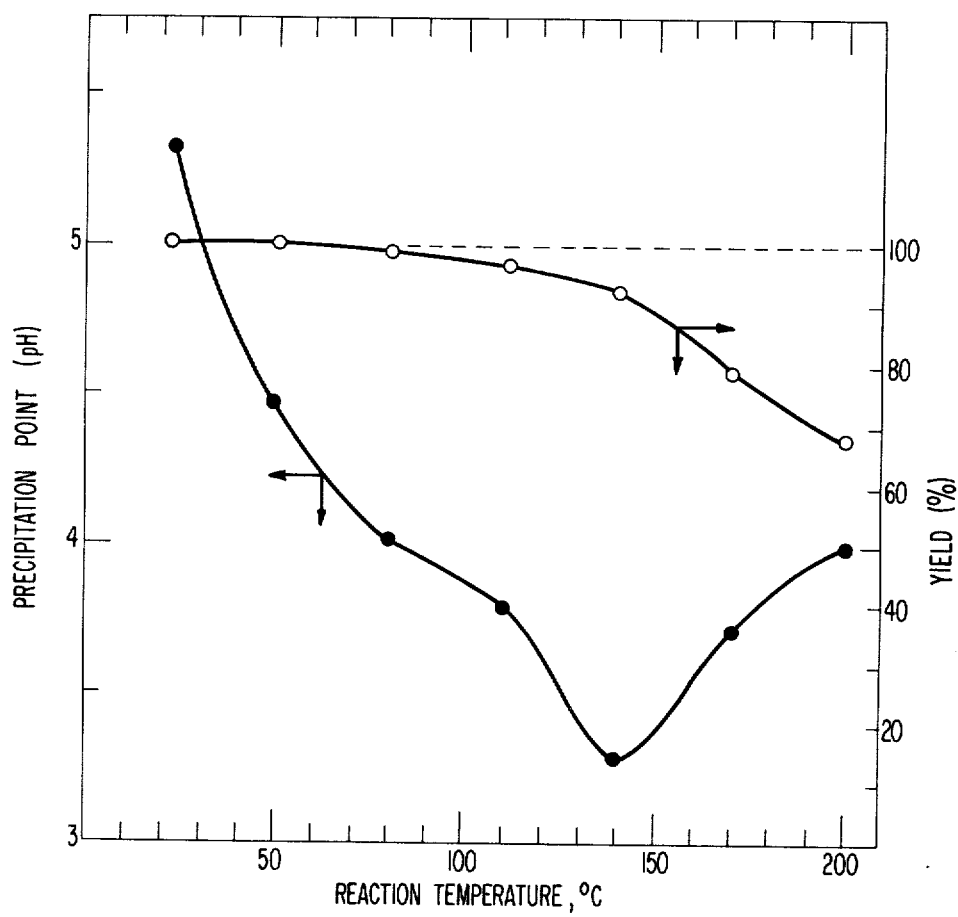
FIG. 3 EFFECT OF REACTION TEMPERATURE ON THE YIELD AND PRECIPITATION POINT OF CARBOXYLIC LIGNIN. LIGNIN-ALKALI RATIO = 100:25 ; REACTION TIME = 2 HOURS

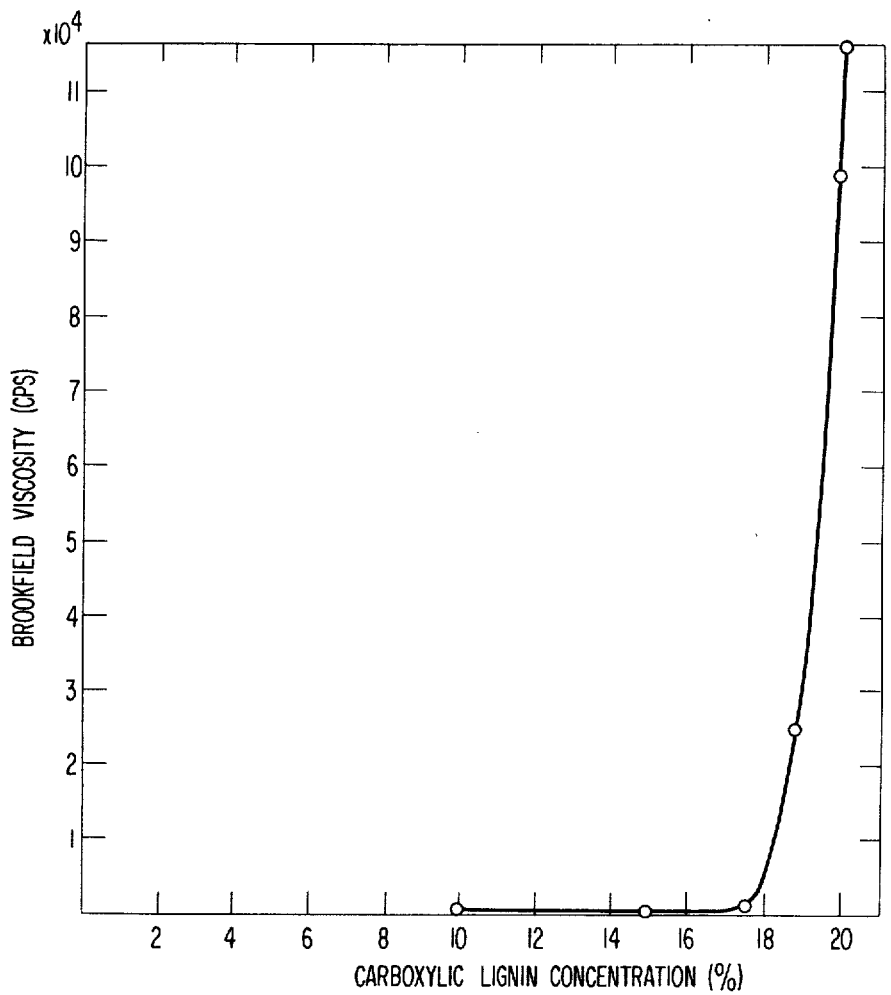
FIG. 4 EFFECT OF LIGNIN CONCENTRATION ON VISCOSITY OF CARBOXYLIC LIGNIN SOLUTION 3,910,873

1

PRODUCTION OF WATER-SOLUBLE POLYCARBOXYLIC LIGNIN BY AN OXYGEN-ALKALI PROCESS

BACKGROUND OF THE INVENTION

1. Field of the Invention

This invention relates to the production of polycarboxylic lignin. More particularly, this invention relates to the production of a water-soluble carboxylated lignin by reaction with alkali and oxygen.

2. The Prior Art

Lignin, as it occurs in all woody plants, is a three-dimensional polymer consisting of rather hydrophobic phenylpropane units. It is only slightly soluble in water. In commercial alkaline pulping processes, pulping chemicals effectively depolymerize lignin macromolecules to lower molecular weights and thus render lignin soluble in alkaline pulping liquors. The solubility of a lignin sample in alkaline solution besides the depolymerization is mainly due to the charges created in the lignin structure as a result of alkaline ionization of phenolic groups. Lignin insolubility in neutral aqueous solution results from the neutralization of phenolic units as the pK of the phenolic units corresponds to about pH 10.

In the kraft pulping process, in addition to alkali, sulfide is another pulping chemical. Sulfide is found to form episulfide in lignin which prevents condensation reaction but assists in the depolymerization of the lignin structure. Episulfide accounts for the increase of sulfur content of lignin during the kraft pulping process. However, the sulfur attached to lignin is unstable and easily lost by heating. As a result, the sulfur content of kraft lignin is rather low. In contrast to lignosulfonate produced in the sulfite process where sulfonate groups are introduced into lignin structure during pulping reaction, kraft (or soda) lignin may have sulfonate groups added by subsequent reactions.

Recently, W. J. Detroit in U.S. Pat. No. 3,726,850 disclosed a water-, alkali- and acid-soluble oxidized lignin dispersing agent produced by reaction of ozone on lignin from alkaline pulping liquors. The ozone-oxidized lignin material of Detroit has particular utility as a dispersant in a wide variety of applications, including the dispersion of clays, dyestuffs, insecticides and the like. In the patent, Detroit also mentions the use of oxygen as oxidant and states, "Oxygen is not a sufficiently active oxidizing agent to oxidize methyl groups or carbonyl groups on the lignin molecule to carboxyl groups under the conditions described hereafter, nor will oxygen alone result in demethylation of the methoxyl groups present in the lignin molecule". In contrast, oxygen is used in the process of this invention.

It is, however, known that lignin is oxidized by molecular oxygen, as disclosed, for example, in U.S. Pat. No. 2,680,113 to E. Alder et al. and in U.S. Pat. No. 2,610,954 to R. Raff et al. Even at room temperature, prolonged treatment with oxygen causes part of lignin to dissolve with a loss of some methoxyl groups. Under the more drastic conditions of high temperatures (~200°C.) and high pressures (55 atm), oxygen is continuously absorbed by lignins; and after 16 hours, all the lignin has passed into solution. At moderate temperatures and pressures, pure vanillin is obtained in about 10 percent yield by air oxidation of sulfite black liquor. Processes based on these conditions are now employed by several industrial chemical plants for the commercial production of vanillin from lignosulfonate.

Interest in developing non-polluting pulping processes has led to model studies examining the reaction mechanisms of lignin and oxygen in alkaline media. Regardless of the relevance of the lignin model compounds studied to native lignin in wood, it has been generally found that guaiacyl (or syringyl) moieties in lignin models may be degraded by oxygen-alkali to several low molecular-weight carboxylic acids and carbon dioxide according to Reaction [1] and [2] shown in FIG. 1. However, to date the model studies have revealed only the two possibilities of lignin condensation reactions, shown in Reactions [3] and [4] of FIG. 1. The dimer formed in Reaction [3] is fragmented further to a benzoic acid. The disadvantage of studies of this sort is obvious as they are unable to ascertain the relative importance of degradation and polymerization reactions occurring in lignin macromolecules under the influence of oxygen and alkali.

To produce a highly carboxylated lignin product having good water solubility, there is need to minimize lignin degradation on the one hand, but maximize lignin solubility on the other. In this regard, lignin polymerization under the influence of oxygen and alkali becomes rather important. Thus, there are three problems needed to be solved to produce a useful carboxylated lignin product by an oxygen-alkali process; minimizing the degradation of lignin to non-recoverable non-lignin product; minimizing the condensation of lignin to less water-soluble material; and maximizing the formation of carboxylic groups.

It is the general object of this invention to provide a process for the production of carboxylated lignin, whereby degradation of lignin to non-recoverable non-lignin products is minimized, condensation of lignin to less water-soluble material is minimized and the formation of carboxylic groups in lignin is maximized.

An additional object of the present invention is to provide a process whereby kraft lignin or soda lignin is carboxylated by treatment with oxygen and alkali while preserving the polymeric lignin structure.

Other objects, features and advantages of the invention will be seen in the following detailed description.

BRIEF DESCRIPTION OF THE DRAWINGS

FIG. 1 shows four reactions of lignin with oxygen.

FIG. 2 shows the amount of polycarboxylic lignin recovered at varying pH's.

FIG. 3 shows the effect of reaction temperature on yield and precipitation point of polycarboxylic lignin.

FIG. 4 shows the effect of lignin concentration on viscosity of oxidized lignin solution.

SUMMARY OF THE INVENTION

The process of this invention involves the preservation of the polymeric lignin structure during oxidation yet providing adequate amounts of carboxylic groups being created in the lignin to give the desired water solubility. Kraft lignin or soda lignin is recovered from black liquor and reacted in the presence of 5 to 50 weight percent of sodium hydroxide and at an oxygen pressure of 50 to 200 psi, a temperature of 25° to 200°C. for at least 5 minutes, but usually for 1 to 6 hours to produce a polycarboxylic lignin which is soluble at pH as low as 3.3 at yields of at least 80 percent and contains 5 to 30 percent by weight oxygen. The process, particularly, calls for a treatment of kraft or soda lignin with oxygen in the presence of 15 to 25 percent sodium hydroxide and at 140°C. for 2 hours, whereupon over 90 percent lignin is recovered; and the carboxylated lignin becomes soluble.

DETAILED DESCRIPTION OF THE INVENTION

Any set of reaction conditions in the carboxylation process will effect simultaneously the above described three problems. Under a set of conditions, there are four parameters to be considered:

(1) alkali charge  (2) reaction temperature
(3) reaction pressure  (4) lignin concentration These parameters interact to influence the above three problems; and the net results are measured by the yield of polycarboxylic lignin, carboxylic content, water solubility and molecular weights of the product.

Raw Material: The raw material for carrying out the present work is lignin obtained from alkaline pulping black liquors (kraft or soda) obtained from the pulping of wood or similar fibrious vegetable matter by any of the common soluble base alkaline pulping processes. The term "lignin" as used herein is intended to mean those lignins produced from alkaline pulping processes and known as alkali lignin. The lignin is preferably separated from the remaining alkaline pulping liquor constituents prior to carrying out the process of oxidation. The process may alternatively be carried out on the whole black liquor, the resulting lignin being recovered by acidification of the liquor to about pH 2–3. The latter process will, however, consume more alkali and oxygen as the oxidation of sulfur compounds and carbohydrate portion of black liquor can occur concurrently. Furthermore, the separation of the carboxylated lignin from other black liquor components will necessarily need the acidification of the liquor to a low pH and thus require an unduly large quantity of mineral acid.

Alkali Charge: High alkali (sodium hydroxide) charge, high reaction temperature and low concentration of alkali lignin solution favor degradation of the lignin to water soluble low molecular-weight materials. At a fixed temperature, 170°C., for example, alkali charge becomes a limiting factor in the degradation of lignin. Alkali charges of 5 to 50 percent by weight, preferably 15 to 25 percent by weight (based on lignin), yield best solubility and optimal yield of carboxylated lignin. An alkali charge below 5 percent does not give the best solubility. On the other hand, an alkali charge higher than 50 percent greatly reduces the yield of lignin and also produces a portion of lignin having poor water solubility. The effect of alkali charge on the solubility characteristic of the carboxylated lignin obtained by the oxidation process of this invention is exemplified in FIG. 2. The effect of alkali charge on yield of carboxylated lignin is presented in Table 1.

TABLE 1 - EFFECT OF ALKALI CHARGE
ON YIELD OF CARBOXYLATED LIGNIN

| Alkali Charge, % | Yield, % |
|---|---|
| 20 | 81 |
| 25 | 80 |
| 50 | 65 |
| 75 | 53 |
| 185 | 15 |

-Continued
TABLE 1 - EFFECT OF ALKALI CHARGE
ON YIELD OF CARBOXYLATED LIGNIN

| Alkali Charge, % | Yield, % |
|---|---|

Notes: $Yield = \dfrac{\text{precipitated at pH 2.5}}{\text{weight of starting lignin}} \times 100$ $Alkali\ charge = \dfrac{\text{weight of sodium hydroxide}}{\text{weight of starting lignin}} \times 100$ The carboxylation of an alkali lignin by oxidation with oxygen in an alkaline medium occurs in about 1 hour or less to about 6 hours, depending upon the oxidation parameters, which time is sufficient for the lignin to consume from 5 to 30 parts of oxygen per 100 parts lignin. Since both oxygen and alkali are essential for the oxidation to proceed, either of the two may be regulated in the oxidation process so that an optimal extent of oxidation of lignin is obtained to give the maximum solubility and yield.

Reaction Temperature: The oxidation of alkali lignin to produce a polycarboxylic lignin may be carried out at any convenient temperature between room temperature, i.e., 25°, to 200°C. However, the preferred temperature is between 110° to 170°C.; and 140°C. is an optimum. As shown in FIG. 3, the yield of carboxylated lignin decreases as reaction temperature increases. The precipitation point (pH at which the carboxylated lignin precipitates) decreases from room temperature to a minimum at 140°C. and increases as the temperature increases further. At a low temperature, inadequate oxidation introduces only a limited amount of carboxyl groups into lignin, thus resulting in inadequate water solubility. This corresponds to a lesser degree of degradation of lignin and a complete recovery of lignin after oxidation. As the reaction temperature increases, loss of lignin starts to occur with a concurrent increase in the water solubility of the carboxylated lignin. However, as the temperature increases to over 140°C., degradation and polymerization result in both low yield and low water solubility of recoverable lignin.

Besides the effect of water solubility and yield of carboxylated lignin, the oxidation temperature also influences greatly other properties of polycarboxylic lignin, such as color, methoxyl content and carboxyl content of the end product as shown in Table 2. For comparison, the properties of a kraft lignin are also listed.

TABLE 2

EFFECT OF OXIDATION TEMPERATURE
ON PROPERTIES OF CARBOXYLIC LIGNIN

| Temperature, °C. | $D_{500}$[1] | $OCH_3$,%[2] | COOH, Meq./g[3] |
|---|---|---|---|
| kraft lignin | 0.48 | 14.24 | 0.51 |
| 50 | 0.72 | 12.6 | 1.44 |
| 80 | 0.75 | 11.5 | 1.77 |
| 110 | 1.02 | 10.7 | 2.11 |
| 140 | 1.38 | 9.75 | 2.30 |
| 170 | 1.86 | 8.95 | 2.87 |
| 200 | 3.75 | 6.85 | 3.39 |

Notes:
[1] Color of polycarboxylic lignin, measured by absorbance at 500 nm per gram lignin.
[2] Methoxyl content, measured by Galbraith Laboratories, Knoxville, Tennessee.
[3] Carboxyl content, Mequiv. per gram lignin, measured by a potentiometric titration method.

Below 140°C., the color, methoxyl content and carboxyl content of recovered lignin increase slowly (almost linearly) with the increase in temperature. Above 140°C., all of the three properties of the carboxylic lignin change rather drastically. Below 140°C., a slow reaction takes place with an activation energy of 6 Kcal/mole. Above 140°C., a rapid reaction occurs with a corresponding activation energy of 23 Kcal/mole. Thus, an optimal temperature for production of water-soluble, carboxylic lignin is about 140°C. At the 140°C. temperature, yield of polycarboxylic lignin can be as high as 95 percent based on the weight of starting lignin. At higher temperatures, particularly at 200°C., the carboxylic lignin obtained is very dark and poorly soluble in water.

For dyestuff dispersing application where staining is important, polycarboxylic lignin produced at a temperature between 110° to 150°C. is preferred.

Reaction Pressure: The process of producing polycarboxylic lignin is controlled mainly by the parameters, alkali charge and oxygen. To deplete either parameter will reduce the rate of oxidation to such a low level that the properties of lignin change little over a long period of time. As the process already specifies the optimal alkali charge and reaction temperature (25 percent alkali charge and 140°C., respectively), any oxygen pressure applied in a batch system or oxygen input in a continuous system of polycarboxylic lignin production which can deplete the alkali charge will be sufficient for the process. For example, with a 25 percent alkali charge, pH of lignin solution usually is above 13, depending on the type of lignin used. When an adequate amount of oxygen is applied to the oxidation process, the pH drops to about 9.5 in a matter of minutes, whereafter little pH change can be observed even after several hours. It is thus convenient to control the degree of oxidation by specifying the alkali charge of 25 percent and by observing the pH drop during the oxygenation process. In batch reactions, the oxygen is preferably applied at an oxygen pressure of 50 to 200 psi. In parts by weight, however, the present process prefers the use of 100 to 150 parts oxygen per 100 parts lignin. Under these specifications, the oxygen consumption is usually about 25 parts per 100 parts lignin. When the desired amount of oxygen has been consumed, the carboxylic lignin may, if desired, be dried such as by spray drying.

Concentration of Lignin Solution: The concentration of lignin in solution prior to addition of alkali has a substantial effect on the properties of the resulting polycarboxylic lignin. The present process of producing water-soluble polycarboxylic lignin prefers lignin concentration less than but usually at least 10 and preferably 15 percent. In general, it is desirable to use fairly concentrated solutions of lignin in the reaction for reasons of economy in drying the final product-containing solution. It has been found, however, that gelling of lignin always occurs when the concentration of lignin solution in the oxidation process is about 18 percent as shown in Table 3 and FIG. 4.

TABLE 3

EFFECT OF LIGNIN CONCENTRATION
ON VISCOSITY OF CARBOXYLIC LIGNIN[1]

| Lignin Concentration, % | Viscosity, Cps. |
|---|---|
| 10 | 12.5 |
| 15 | 38 |
| 17.5 | 950 |

TABLE 3-Continued

EFFECT OF LIGNIN CONCENTRATION
ON VISCOSITY OF CARBOXYLIC LIGNIN[1]

| Lignin Concentration, % | Viscosity, Cps. |
|---|---|
| 18.7 | 32,400 |
| 20 | 120,000 |

Notes:
[1] The ratio of lignin, alkali and oxygen (by weight) was kept at 100:25:150 in all cases. Oxidation time = 2 hours; Temperature = 140°C.

Without wishing to be limited as to theory, it is believed that at a lignin concentration higher than 18 percent, a drop in pH of the oxidized lignin solution plus the decrease in the formation of carboxyl groups and increase in the condensation of lignin are reasons for the gelling phenomenon. Furthermore, polycarboxylic lignins produced at lignin concentrations above 18 percent have inferior water solubility when compared to carboxylic lignins made at low lignin concentrations.

Properties and Uses: Polycarboxylic lignins produced by the present process are a new ligno-carboxylate from alkali (kraft or soda) lignins using oxygen and alkali as the reacting chemicals. As a result, they contain little sulfur.

Polycarboxylic lignins have water solubility characteristics between alkali lignin and lignosulfonate as carboxylic groups are not as acidic as sulfonate groups. This unique property finds usefulness in the dispersant area and nonionic emulsion stabilizing applications. The polycarboxylic lignins give satisfactory dyestuff dispersing ability without excessive staining. They are also good nonionic asphalt emulsion stabilizers.

The carboxyl content of the carboxylic lignins may be over 5 times of that for kraft lignin. By a "dynamic ion-exchange method", a gram of the carboxylic lignins has been shown to be capable of complexing $9.5 \times 10^{-3}$ moles of calcium ions. The combination of high molecular weight and strong calcium complexing ability of carboxylic lignins make them an attractive material for scale control application. Other areas of application for polycarboxylic lignins include drilling muds for oil wells, industrial cleaning compositions, de-rusting and rubber additives.

Polycarboxylic lignins have a precipitation point at pH in the range of 3.3 to 5.0, and the precipitation point can be raised to pH 7 by addition of small quantities of calcium. This makes polycarboxylic lignins unique in comparison to lignosulfonates in that co-precipitation with rubber, protein and other substances at the appropriate pH range of 3.5 to 7 can be conveniently accomplished.

The following specific examples of the process of this invention and the properties of the products obtained thereby will serve to exemplify the advantages of the invention in providing the polycarboxylic lignin.

EXAMPLE 1

Twenty (20) grams of kraft lignin obtained from the pulping of southern pine and the liquors of the pulping of southern pine were slurried in 180 ml. of distilled water. Eight (8) grams of sodium hydroxide (50%) were added to the slurry, and the lignin solution was placed in a two-liter bomb. Oxygen at a pressure of 200 psi. was applied to the bomb, and the contents were cooked at 170°C. for 2 hours. Approximately 80 percent of the lignin was recovered and was soluble in water and acids to a pH 3.75 (at 2 percent concentration of lignin solution). The carboxyl content of the lignin was 2.87 miliequivalents per gram of lignin.

EXAMPLE 2

Lignin solution as in Example 1 was cooked at 140°C. for 2 hours at an initial oxygen pressure of 200 psi. Approximately 92 percent of the lignin was recovered, which was soluble to a pH of 3.3, and has a carboxyl content of 2.30 miliequivalents per gram of lignin.

EXAMPLE 3

Lignin solution as in Example 1 was cooked at 110°C. for 2 hours. In this case, approximately 96 percent of the lignin was recovered which was soluble to a pH of 3.8, and has a carboxyl content of 2.11 miliequivalent per gram.

Examples 1, 2 and 3 illustrate the importance of choosing a correct temperature in the oxygenation process of alkali lignins.

As indicated above, the water solubility of oxidized alkali lignin (kraft or soda) relies on carboxyl content and molecular weight of the lignin. Due to the fact that an increase in reaction temperature accelerates both the formation of carboxyl groups and condensation of lignin structural units, the former contributes to water solubility, whereas the latter reduces it. It is seen here that the reaction temperature of 140°C. is optimal.

EXAMPLE 4

A 20 percent soda lignin solution (50 gallons) with a 25 percent alkali charge was fed through a heat exchanger at a rate of 1.8 gallons per minute, accompanied by concurrent feeding of oxygen at a rate of 8.6 cubic feet per minute (at ambient temperature). The temperature of the heat exchanger was set at 140°C. by adjusting steam pressure. The retention time of the lignin solution in the heat exchanger was approximately 10 to 15 minutes, and the reaction pressure was 200 psi. The lignin solution was then discharged from the heat exchanger. Carboxylic lignin was produced in over 95 percent yield by the continuous process and was soluble at pH of above 4.5 and has a carboxyl content of about 1.5 miliequivalents per gram of lignin.

This example shows that because of the rapid reaction of lignin with oxygen at the specified temperature, water soluble carboxylic lignin may be economically produced by a continuous process which requires a short retention time of lignin solution and other reactants in a reaction vessel.

EXAMPLE 5

For comparisons with the present process, lignin solutions of kraft lignin were oxidized with air. Thus, 20 grams of kraft lignin were slurried in 180 ml. of distilled water. Eight (8) grams of sodium hydroxide (50%) were added to the slurry, and the lignin solution was placed in a three-necked flask equipped with a thermometer and mechanical stirrer. Air was bubbled through the lignin solution under stirring at 25°C. The pH of the solution dropped slowly with time; and after 3 days, it became 11.8 (from original pH of 13.3). After 15 days, the pH became 10.6. The lignin samples recovered after a 3-day and 15-day air oxidation were soluble down to pH 5.2 and pH 4.8, respectively. The 15-day sample had a carboxyl content of 1.63 miliequivalents per gram.

EXAMPLE 6

Lignin solution as in Example 5 was air oxidized at approximately 70°C. After 5 days, the pH of the solution dropped to 10.7. The isolated lignin was soluble above pH 4.5 and had a carboxyl content of 1.8 miliequivalents per gram. In air oxidation of the lignin solution, foaming was invariably a problem.

The above two examples indicate that the air oxidation process not only is time consuming, but also produces oxidized ligin which is soluble at a higher pH than the carboxylic lignin produced according to the present invention.

EXAMPLE 7

The carboxylic lignins made by the process of this invention are also extremely effective in the dispersion of a variety of dyestuffs. Data in Table 4 illustrate the dispersing ability and temperature stability of the carboxylic lignins made by the process of this invention in comparison to sulfonated lignin controlled dipsersants commonly used in the commercial dispersion of dyestuffs. The tests were run in the following manner.

Fifty (50) grams of a standard commercial disperse dye, Red 1, 35 grams of the selected lignin dispersing agent and 235 grams of water were ball-milled for 48–72 hours at a pH of 7.0 – 7.5 at which time the milled dyestuff was sufficiently dispersed so that a 2.7 ml. aliquot diluted to 250 ml. passed completely through a tared No. 4 Whatman filter paper. The paper is dried and reweighed and the milligrams of dyestuff left on the paper is recorded. Then a second 2.7 ml. aliquot was taken and diluted to 250 ml. with tap water. With constant stirring, the sample was brought to a boil and held for 15 minutes. The sample was then filtered through a tared No. 4 Whatman filter paper. The paper was dried and weighed and the residual on the paper recorded.

TABLE 4

| | Dispersion Mg. Residue | Heat Stability Mg. Residue |
|---|---|---|
| Polycarboxylated Lignin 49A | 4 | 5 |
| Standard Dispersant[1] | 12 | 85 |

[1]Reax 80C a commercial sulfonated lignin dispersant used by the dyestuff industry.

While this invention has been described and illustrated with specific examples and descriptions, it is understood that the invention is not to be limited to the exact details of operation or exact component shown and described herein, as obvious modifications and equivalents will be apparent to those skilled in the art, and the invention is therefore to be limited only by the scope within the claims.

What is claimed is:

1. A process for preparing a polycarboxylic lignin which comprises,
   a. dissolving an alkali lignin which is substantially free of organically bound sulfur in an aqueous solution less than 18 percent by weight of lignin,
   b. adding alkali until the lignin solution contains 5 to 50 percent of alkali by weight of lignin, and
   c. reacting oxygen with said alkaline solution of lignin at a temperature between about 25°C. and 200°C. and a pressure of 50 to 200 p.s.i. for a time sufficient to consume into said alkaline solution of lignin between 5 and 30 parts of oxygen per 100 parts of lignin.

2. The process of claim 1 wherein said oxidizing temperature is between 110° and 170°C. and the concentration of lignin in said solution is about 15 percent.

3. The process of claim 1 wherein said alkali concentration is between 15 and 25 percent by weight of lignin.

4. The process of claim 3 wherein said temperature is about 140°C. and said polycarboxylic lignin is water soluble above pH 3.3.

5. The process of claim 1 wherein said oxygen is reacted for 10 minutes to 6 hours.

6. The process of claim 1 wherein said oxygen is reacted with said alkalin solution at an oxygen concentration of 100 to 150 parts of oxygen per 100 parts of lignin.

7. The process of claim 1 wherein said lignin is a kraft lignin.

8. The process of claim 1 wherein said lignin is in the form of alkaline pulping black liquor.

9. The process of claim 1, further comprising,
   d. drying said solution of carboxylic lignin to a substantially dry state.

* * * * *

UNITED STATES PATENT OFFICE
CERTIFICATE OF CORRECTION

PATENT NO. : 3,910,873
DATED : October 7, 1975
INVENTOR(S) : Stephen Y. Lin

It is certified that error appears in the above--identified patent and that said Letters Patent are hereby corrected as shown below:

Column 3, line 23, "fibrious" should be --fibrous--.

Column 4, line 10, in Table 1 -Continued, "Alkali charge = $\frac{\text{weight of sodium hydroxide}}{\text{weight of starting lignin}}$ x 100" should read --Alkali charge = $\frac{\text{weight of sodium hydroxide}}{\text{weight of starting lignin}}$ x 100--.

Column 8, line 11, "ligin" should be --lignin--.

Column 8, line 21, "dipsersants" should be --dispersants--.

Column 10, line 2, in claim 6, "alkalin" should be --alkaline--.

Signed and Sealed this

*twenty-third* Day of *December 1975*

[SEAL]

Attest:

RUTH C. MASON
*Attesting Officer*

C. MARSHALL DANN
*Commissioner of Patents and Trademarks*